United States Patent
Verdie et al.

(10) Patent No.: US 12,148,097 B2
(45) Date of Patent: Nov. 19, 2024

(54) METHODS AND SYSTEMS FOR 3D HAND POSE ESTIMATION FROM RGB IMAGES

(71) Applicants: Yannick Verdie, Toronto (CA); Zihao Yang, Richmond Hill (CA); Deepak Sridhar, San Diego, CA (US); Steven George McDonagh, London (GB); Juwei Lu, North York (CA)

(72) Inventors: Yannick Verdie, Toronto (CA); Zihao Yang, Richmond Hill (CA); Deepak Sridhar, San Diego, CA (US); Steven George McDonagh, London (GB); Juwei Lu, North York (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 159 days.

(21) Appl. No.: 18/078,832

(22) Filed: Dec. 9, 2022

(65) Prior Publication Data
US 2024/0193866 A1    Jun. 13, 2024

(51) Int. Cl.
  G06T 17/00    (2006.01)
  G06F 3/01     (2006.01)
  G06T 17/20    (2006.01)
  G06V 40/20    (2022.01)

(52) U.S. Cl.
  CPC .............. *G06T 17/20* (2013.01); *G06F 3/017* (2013.01); *G06V 40/28* (2022.01)

(58) Field of Classification Search
  None
  See application file for complete search history.

(56) References Cited

U.S. PATENT DOCUMENTS

| | | | | |
|---|---|---|---|---|
| 11,482,048 B1* | 10/2022 | Diaz-Arias | ............... | G06T 7/75 |
| 11,763,235 B1* | 9/2023 | Penfield | ................ | G06F 40/205 |
| | | | | 704/9 |
| 2008/0031512 A1* | 2/2008 | Mundermann | ........ | G06V 40/23 |
| | | | | 382/154 |
| 2008/0180448 A1* | 7/2008 | Anguelov | ............... | G06T 13/40 |
| | | | | 345/475 |
| 2011/0208444 A1* | 8/2011 | Solinsky | ............... | A61B 5/1114 |
| | | | | 702/41 |
| 2020/0327465 A1* | 10/2020 | Baek | ...................... | G16H 50/20 |
| 2020/0387698 A1* | 12/2020 | Yi | .......................... | G06N 3/084 |
| 2022/0386942 A1* | 12/2022 | Diaz-Arias | ............. | A61B 5/45 |

* cited by examiner

*Primary Examiner* — Martin Mushambo

(57) ABSTRACT

Methods and systems for estimation of a 3D hand pose are disclosed. A 2D image containing a detected hand is processed using a U-net network to obtain a global feature vector and a heatmap for the keypoints of the hand. Information from the global feature vector and the heatmap are concatenated to obtain a set of input tokens that are processed using a transformer encoder to obtain a first set of 2D keypoints representing estimated 2D locations of the keypoints in a first view. The first set of 2D keypoints are inputted as a query to a transformer decoder, to obtain a second set of 2D keypoints representing estimated 2D locations of the keypoints in a second view. The first and second sets of 2D keypoints are aggregated to output the set of estimated 3D keypoints.

20 Claims, 4 Drawing Sheets

METHODS AND SYSTEMS FOR 3D HAND POSE ESTIMATION FROM RGB IMAGES

FIELD

The present disclosure relates to methods and systems for hand pose estimation using computer vision.

BACKGROUND

Humans are familiar with the use of their hands for various types of interactions, such as handing over an object, communicating in sign language, performing recognizable gestures, etc. As such, the ability for a computing system to accurately recognize a hand gesture performed by a human user has been of interest for providing an intuitive user experience. Hand pose estimation is a machine learning task that estimates a 3D pose of the hand. However, performing hand pose estimation from a single 2D image can be difficult, for example due to occlusions, depth and scale ambiguities, and self-similarity.

Some existing approaches attempt to address or avoid these difficulties by using special equipment, such as markers, electronic gloves or depth cameras. However, the need for special equipment limits practical application.

Accordingly, a solution for hand pose estimation using images from RGB cameras would be useful.

SUMMARY

In various examples, the present disclosure provides methods and systems that enable estimation of a hand pose from a single 2D RGB image. In the disclosed examples, a first set of 2D keypoints (corresponding to 2D locations of 21 joints of the hand) can be estimated from a single 2D RGB image. The first set of 2D keypoints is an estimation of the joints of the hand from the viewpoint of the single 2D RGB image (e.g., a frontal view). A second set of 2D keypoints is further estimated, which is an estimation of the joints of the hand from a different viewpoint that is not shown in the single 2D RGB image (e.g., a side view). The two sets of estimated 2D keypoints, representing two views of the hand, are combined to obtain a set of 3D keypoints (corresponding to 3D locations of 21 joints of the hand) that represent the estimated 3D hand pose.

The 3D hand pose estimation network, as disclosed herein, may be trained using a training dataset annotated with keypoints corresponding to the joints of the hand, without requiring annotation of the vertices of a 3D mesh of the hand. This provides the technical advantage that the 3D hand pose estimation network may be more easily trainable, with reductions in computational costs and data annotation costs.

In some examples, the need for an explicit hand classifier to distinguish between a left hand and a right hand may be avoided. This may provide an advantage that the computational complexity is reduced, thus enabling implementation on computing systems having limited processing power (e.g., mobile devices such as smartphones).

In some examples, the present disclosure may enable 3D hand pose estimation in real-time or near real-time, which may be desirable for various real-world applications, such as enabling gesture-based user interactions, gaming applications, and virtual reality (VR) or augmented reality (AR) applications, among others.

In some example aspects, the present disclosure describes a computing system including: a processing unit configured to execute instructions to cause the computing system to estimate a set of 3D keypoints representing a 3D hand pose by: processing a 2D image containing a detected hand using a U-net network to obtain a global feature vector and a heatmap for each of the keypoints; concatenating information from the global feature vector and the heatmap to obtain a set of input tokens; processing the input tokens using a transformer encoder to obtain a first set of 2D keypoints representing estimated 2D locations of the keypoints in a first 2D view; inputting the first set of 2D keypoints as a query to a transformer decoder, with cross-attention from the transformer encoder, to obtain a second set of 2D keypoints representing estimated 2D locations of the keypoints in a second 2D view; and aggregating the first and second sets of 2D keypoints to output the set of estimated 3D keypoints.

In an example of the preceding example aspect of the system, the processing unit may be further configured to execute instructions to cause the computing system to perform operations of: estimating a set of one or more bone lengths from the first set of 2D keypoints; processing the first set of 2D keypoints and the estimated set of one or more bone lengths using respective one-layer feedforward networks, to obtain a plurality of hand class estimations representing a handedness of the detected hand; and aggregating the plurality of hand class estimations to obtain an estimated hand class representing an estimated handedness of the detected hand.

In an example of any of the preceding example aspects of the system, the processing unit may be further configured to execute instructions to cause the computing system to perform operations of: rendering a 3D model representation of the detected hand by mapping the set of estimated 3D keypoints to a 3D mesh.

In an example of any of the preceding example aspects of the system, the processing unit may be further configured to execute instructions to cause the computing system to perform operations of: performing gesture recognition by processing the set of estimated 3D keypoints using a gesture recognition software module.

In an example of any of the preceding example aspects of the system, the first set of 2D keypoints may represent estimated 2D locations of the keypoints in the first 2D view corresponding to a view of the detected hand captured in the 2D image, and the second set of 2D keypoints may represent estimated 2D locations of the keypoints in the second 2D view corresponding to a different view of the detected hand not captured in the 2D image.

In an example of any of the preceding example aspects of the system, concatenating information from the global feature vector and the heatmap to obtain a set of input tokens may include: processing the global feature vector using a feedforward network to obtain a regressor representing a 2D global estimation of each respective keypoint; processing the heatmap using a spatial softmax layer to obtain a 2D heatmap estimation of each respective keypoint; and concatenating the global feature vector with the 2D global estimation and the 2D heatmap estimation to obtain the input token for each respective keypoint.

In an example of any of the preceding example aspects of the system, the U-net network, the transformer encoder and the transformer decoder may be trained together end-to-end, using a training dataset comprising 2D images annotated with keypoints corresponding to joints of a hand and without annotation of vertices corresponding to a 3D mesh of the hand.

In an example of any of the preceding example aspects of the system, the computing system may be one of: a mobile device; a smart appliance; an Internet of Things (IOT) device; an augmented reality (AR) device; or a virtual reality (VR) device.

In some example aspects, the present disclosure describes a computer-implemented method for estimating a set of 3D keypoints representing a 3D hand pose, the method including: processing a 2D image containing a detected hand using a U-net network to obtain a global feature vector and a heatmap for each of the keypoints; concatenating information from the global feature vector and the heatmap to obtain a set of input tokens; processing the input tokens using a transformer encoder to obtain a first set of 2D keypoints representing estimated 2D locations of the keypoints in a first 2D view; inputting the first set of 2D keypoints as a query to a transformer decoder, with cross-attention from the transformer encoder, to obtain a second set of 2D keypoints representing estimated 2D locations of the keypoints in a second 2D view; and aggregating the first and second sets of 2D keypoints to output the set of estimated 3D keypoints.

In an example of the preceding example aspect of the method, the method may include: estimating a set of one or more bone lengths from the first set of 2D keypoints; processing the first set of 2D keypoints and the estimated set of one or more bone lengths using respective one-layer feedforward networks, to obtain a plurality of hand class estimations representing a handedness of the detected hand; and aggregating the plurality of hand class estimations to obtain an estimated hand class representing an estimated handedness of the detected hand.

In an example of any of the preceding example aspects of the method, the method may include: rendering a 3D model representation of the detected hand by mapping the set of estimated 3D keypoints to a 3D mesh.

In an example of any of the preceding example aspects of the method, the method may include: performing gesture recognition by processing the set of estimated 3D keypoints using a gesture recognition software module.

In an example of any of the preceding example aspects of the method, the first set of 2D keypoints may represent estimated 2D locations of the keypoints in the first 2D view corresponding to a view of the detected hand captured in the 2D image, and the second set of 2D keypoints may represent estimated 2D locations of the keypoints in the second 2D view corresponding to a different view of the detected hand not captured in the 2D image.

In an example of any of the preceding example aspects of the method, concatenating information from the global feature vector and the heatmap to obtain a set of input tokens may include: processing the global feature vector using a feedforward network to obtain a regressor representing a 2D global estimation of each respective keypoint; processing the heatmap using a spatial softmax layer to obtain a 2D heatmap estimation of each respective keypoint; and concatenating the global feature vector with the 2D global estimation and the 2D heatmap estimation to obtain the input token for each respective keypoint.

In an example of any of the preceding example aspects of the method, the U-net network, the transformer encoder and the transformer decoder may be trained together end-to-end, using a training dataset comprising 2D images annotated with keypoints corresponding to joints of a hand and without annotation of vertices corresponding to a 3D mesh of the hand.

In some examples, the present disclosure describes a non-transitory computer-readable medium having instructions encoded thereon, where the instructions are executable by a processing unit of a computing system to cause the computing system to perform operations of: processing a 2D image containing a detected hand using a U-net network to obtain a global feature vector and a heatmap for each of the keypoints; concatenating information from the global feature vector and the heatmap to obtain a set of input tokens; processing the input tokens using a transformer encoder to obtain a first set of 2D keypoints representing estimated 2D locations of the keypoints in a first 2D view; inputting the first set of 2D keypoints as a query to a transformer decoder, with cross-attention from the transformer encoder, to obtain a second set of 2D keypoints representing estimated 2D locations of the keypoints in a second 2D view; and aggregating the first and second sets of 2D keypoints to output the set of estimated 3D keypoints.

In an example of the preceding example aspect of the computer-readable medium, the instructions may be executable to cause the computing system to perform any of the preceding example aspects of the method.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DETAILED DESCRIPTION

Figure 1:
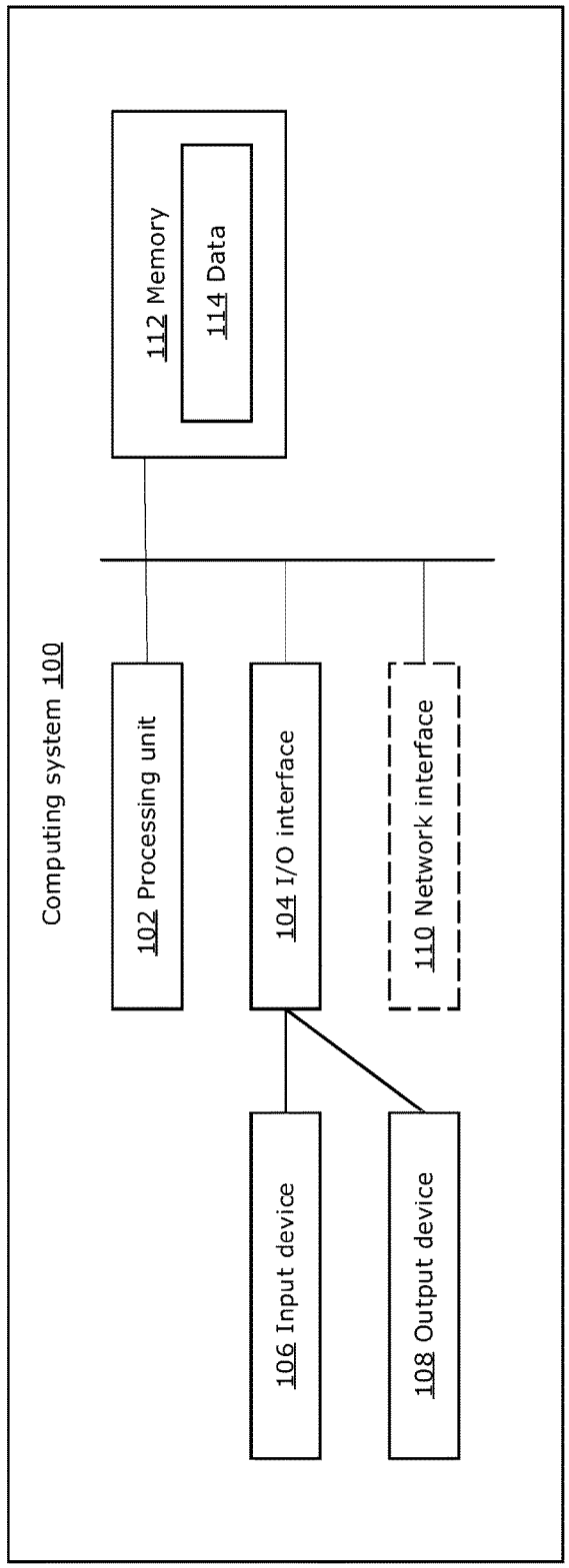
FIG. 1 is a block diagram of an example computing system which may be used to implemented examples of the present disclosure.

In various examples, the present disclosure describes methods and systems enabling 3D hand pose estimation, which may be used for gesture-based control of a device, rendering a 3D hand, etc. Examples of the present disclosure may be implemented in various computing devices, such as a television (e.g., smart TV), a mobile communication device (e.g., smartphone), a tablet device, a desktop device, a vehicle-based device (e.g., a dashboard device) or a smart speaker, among other possibilities. Examples of the present disclosure may also be implemented for augmented reality (AR), virtual reality (VR), or video game applications, among other possibilities.

For simplicity, the present disclosure describes examples in the context of a computing device having a camera to capture 2D RGB images in real-time or near real-time. However, it should be understood that the present application is not limited to such embodiments; for example, some examples of the present disclosure may be implemented by a computing device that receives 2D RGB images from an external system; other examples of the present disclosure may be used to process previously-stored 2D RGB images.

To assist in understanding the present disclosure, some existing approaches for 3D hand pose estimation are first discussed.

3D hand pose estimation typically involves estimating the 3D coordinates of the joints of the hand from input image data such as a 2D RGB image. Generally, the joints of the hand may be represented by a set of 21 3D keypoints. After the set of 3D keypoints has been estimated, this may be further processed for example to perform gesture classification. In some cases, it may be desirable to render the estimated 3D hand pose (e.g., in AR or VR applications). Rendering the 3D hand pose may require estimation of a polygon mesh that represents the 3D shape of the hand. A polygon mesh generally is a collection of vertices, edges and faces that represents the shape of a 3D object.

Some existing 3D hand pose estimation techniques are based on using a parametric model, such as the popular MANO model (e.g., as described by Romero et al. "Embodied Hands: Modeling and Capturing Hands and Bodies Together" *ACM Transactions on Graphics* Vol. 36 No. 6, Article 245, November 2017). Such techniques parameterizes a hand model using coefficients of hand shape and hand pose parameters. A drawback of using a parametric model is that there is a limited number of hand poses that can be represented. Further, a very large parametric model may be required, which increases computational requirements and prevents implementation in real-time applications and/or on consumer devices.

Some other existing 3D hand pose estimation techniques use a depth map together with a 2D image to estimate a 2.5D representation (where 2.5D means 2D plus depth), and then a 3D estimation of the hand pose is generated using the 2.5D representation. However, such techniques have been found to generally result in lower estimation accuracy, or require significant computational costs to achieve high accuracy. Further, the need for depth information may require the use of depth sensors (e.g., infrared sensors), which may not be practical in real-world applications.

More recently, there has been interest in techniques that lift 2D estimations to 3D. In such techniques, hand keypoints are first estimated in 2D, then a neural network (e.g., a decoder) estimates 3D joints and mesh vertices from the 2D estimation. However, a drawback of existing 2D lifting techniques is that the neural networks require training data that is annotated for both 3D joints and mesh vertices. It is typically very costly to annotate mesh vertices, because of the large number of vertices typically required (e.g., a common template used as the polygon mesh for a 3D hand contains 778 vertices). Further, estimation of such a large number of 3D vertices is a difficult machine learning task, and training a neural network to achieve a desired degree of accuracy in such a task can be difficult and time-consuming.

In various examples, the present disclosure describes methods and systems that estimates 2D keypoints from a single 2D RGB image input, and lifts the estimation to 3D space using an approach that synthesizes 2D estimations from two different 2D viewpoints (in which one of the viewpoints is estimated from the 2D RGB image input). The disclosed methods and systems do not require the use of training data having annotated vertices. This may simplify and/or speed up the training phase, and may avoid the need for costly manual data labelling. The learned model may require smaller memory space compared to some existing approaches (e.g., compared to techniques that use the MANO model), which may be beneficial for practical applications.

FIG. 1 is a block diagram illustrating a simplified example implementation of a computing system 100 that is suitable for implementing embodiments described herein. For example, the computing system 100 may represent a television (e.g., smart TV), a mobile communication device (e.g., smartphone), a tablet device, a desktop device, a vehicle-based device (e.g., a dashboard device), a smart speaker, an AR system, or a VR system, among other possibilities. Examples of the present disclosure may be implemented in other computing systems, which may include components different from those discussed below. Although FIG. 1 shows a single instance of each component, there may be multiple instances of each component in the computing system 100. The computing system 100 may be used to execute instructions for training a neural network model, using any of the examples described above. The computing system 100 may also to execute the trained neural network model, or the trained neural network model may be executed by another computing system.

Although FIG. 1 shows a single instance of each component, there may be multiple instances of each component in the computing system 100. Further, although the computing system 100 is illustrated as a single block, the computing system 100 may be a single physical machine or device (e.g., implemented as a single computing device, such as a single workstation, single consumer device, single server, etc.), or may comprise a plurality of physical machines or devices (e.g., implemented as a server cluster). For example, the computing system 100 may represent a group of servers or cloud computing platform providing a virtualized pool of computing resources (e.g., a virtual machine, a virtual server).

The computing system 100 includes at least one processing unit 102 (which may have one or more processing cores), such as a processor, a microprocessor, a digital signal processor, an application-specific integrated circuit (ASIC), a field-programmable gate array (FPGA), a dedicated logic circuitry, a dedicated artificial intelligence processor unit, a graphics processing unit (GPU), a tensor processing unit (TPU), a neural processing unit (NPU), a hardware accelerator, or combinations thereof.

The computing system 100 in this example includes an input/output (I/O) interface 104, which may enable interfacing with at least one input device 106 (e.g., a camera, a keyboard, a mouse, a microphone, a touchscreen, and/or a keypad) and at least one output device 108 (e.g., a display, a speaker and/or a printer). In the example shown, the input device 106 and output device 108 are shown part of the computing system 100. In other example embodiments, the input device 106 and/or output device 108 may be external to the computing system 100. In other examples, the input device 106 and/or output device 108 may be optional, and the I/O interface 104 may also be optional.

The computing system 100 may include an optional network interface 110 for wired or wireless communication with other computing systems (e.g., other computing systems in a network). The network interface 110 may include wired links (e.g., Ethernet cable) and/or wireless links (e.g., one or more antennas) for intra-network and/or inter-network communications. For example, the network interface 110 may enable the computing system 100 to access training data samples from an external database, or a cloud-based datacenter (among other possibilities) where training datasets are stored. The network interface 110 may enable the computing system 100 to communicate trained parameters (e.g., weight values) of a trained keypoint estimation network to another computing system (e.g., an edge computing device or other end consumer device) where the trained keypoint estimation network is to be deployed for inference.

The computing system 100 may include a memory 112, which may include a volatile or non-volatile memory (e.g., a flash memory, a random access memory (RAM), and/or a read-only memory (ROM)). The non-transitory memory 112 may store instructions for execution by the processing unit 102, such as to carry out examples described in the present disclosure. For example, the memory 112 may store instructions for implementing any of the neural networks and methods disclosed herein. The memory 112 may include other software instructions, such as for implementing an operating system and other applications/functions. The memory 112 may also include data 114, such as trained parameters (e.g., weight values) of a neural network.

In some examples, the computing system 100 may also include an electronic storage unit (not shown), such as a solid state drive, a hard disk drive, a magnetic disk drive and/or an optical disk drive. In some examples, data and/or instructions may be provided by an external memory (e.g., an external drive in wired or wireless communication with the computing system 100) or may be provided by a transitory or non-transitory computer-readable medium. Examples of non-transitory computer readable media include a RAM, a ROM, an erasable programmable ROM (EPROM), an electrically erasable programmable ROM (EEPROM), a flash memory, a CD-ROM, or other portable memory storage. The components of the computing system 100 may communicate with each other via a bus, for example.

Figure 2:
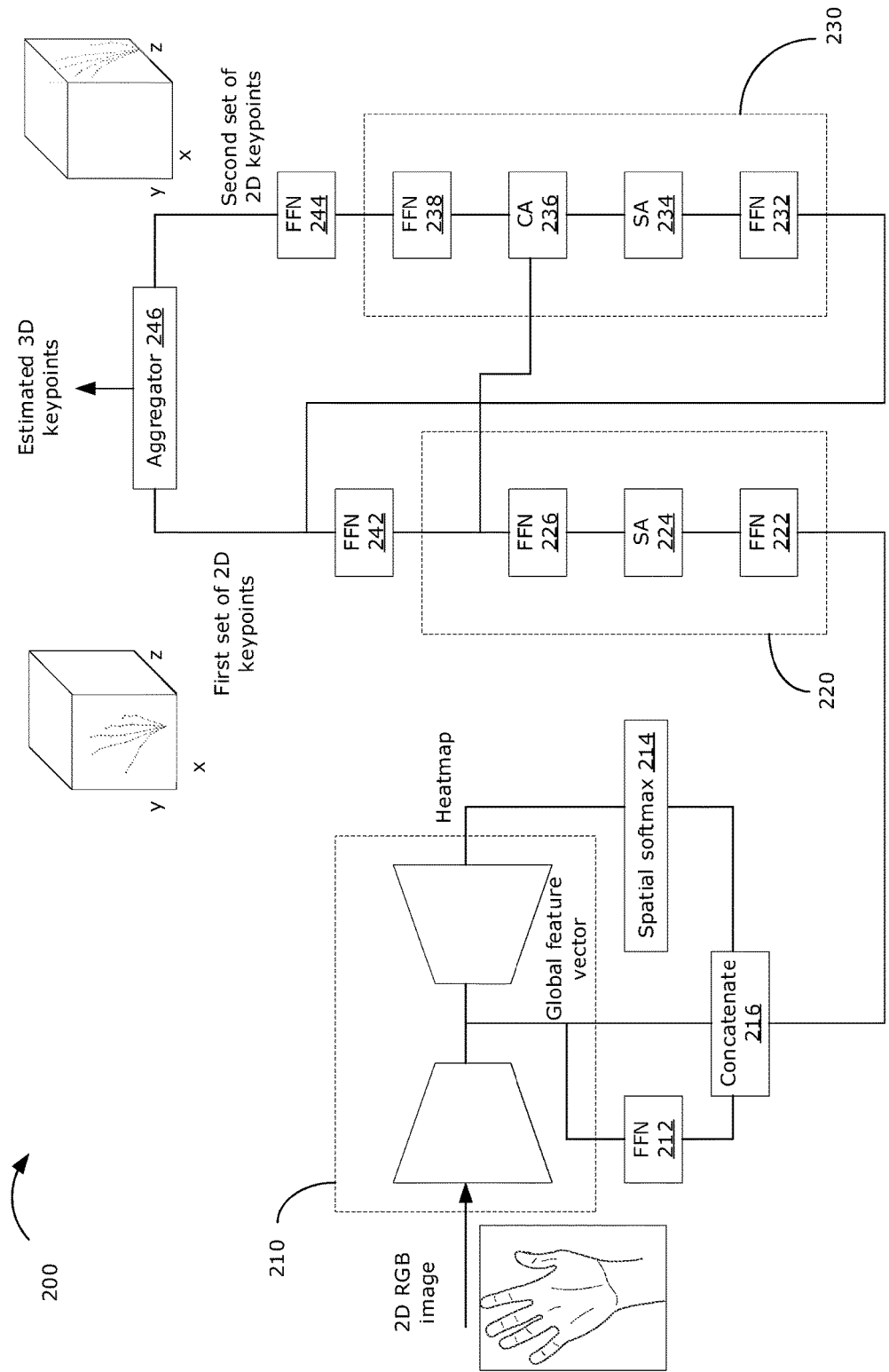
FIG. 2 is a block diagram of an example 3D hand pose estimation network, in accordance with examples of the present disclosure.

FIG. 2 is a block diagram of an example 3D hand pose estimation network 200, in accordance with examples of the present disclosure.

The 3D hand pose estimation network 200 includes a U-net network 210, a transformer encoder 220, and a transformer decoder 230 as the main components. It should be understood that the U-net network 210, transformer encoder 220 and transformer decoder 230 may have sub-blocks different from those illustrated in FIG. 2, while still performing their respective functions.

In some examples, pre-training of the U-net network 210, transformer encoder 220 and/or transformer decoder 230 may be performed. For example, the U-net network 210 may be pre-trained to perform a classification task (such as a hand classification task). In some examples, the transformer encoder 220 and decoder 230 may also be pre-trained. In other examples, pre-training may not be performed. If pre-training is not performed, the values of the neural network weights in the U-net network 210, transformer encoder 220 and/or transformer decoder 230 may be randomly initialized. The 3D hand pose estimation network 200 may be trained end-to-end (with or without pre-training), using training datasets containing 2D RGB images of hands annotated with the 3D locations of the 21 keypoints of each hand.

The transformer encoder 220 and decoder 230 architecture may be similar to transformer encoder-decoders that have been used in natural language processing (NLP) applications, such as for machine translations. For example, a suitable encoder-decoder architecture may be that described by Vaswani et al. "Attention Is All You Need", arXiv: 1706.03762. However, the present disclosure has adapted the transformer encoder 220 and decoder 230 to estimate 2D keypoints representing the joints of a hand in two different views.

The U-net network 210 is a convolutional network that is designed for processing 2D images. The U-net network 210 may be based on a ResNet or HRNet architecture (e.g., as described by He et al. "Deep Residual Learning for Image Recognition", arXiv: 1512.03385, and by Sun et al. "High-Resolution Representations for Labeling Pixels and Regions", arXiv: 1904.04514), for example. The U-net network 210 may be pre-trained on the ImageNet-101 dataset, for example. A 2D RGB image is provided as input to the U-net network 210. The 2D RGB image input may be an image patch that is cropped from a larger 2D image (e.g., as shown in FIG. 2). For example, a 2D RGB image containing a hand may be preprocessed by a hand detection network, which estimates a bounding box containing a detected hand. The estimated bounding box may be used to crop the image such that the 2D RGB image inputted to the 2D hand pose estimation network 200 is an image patch that contains the detected hand, without background objects.

The U-net network 210 comprises a contracting stage (also referred to as a downsampling stage) and an expanding stage (also referred to as an upsampling stage). The contracting stage comprises any suitable number of contracting blocks, each of which may include a convolutional layer, a rectified linear unit (ReLU) layer and a max pooling layer. The contracting stage serves to encode the 2D RGB image input to a lower-dimensional set of global features (e.g., 1D global features). The contracting stage is followed by an expanding stage, where the number of expanding blocks in the expanding stage matches the number of contracting blocks in the contracting stage. Connections from each contracting block to the corresponding expanding block enables context information to be propagated to the expanding stage, such that the expanding stage has both feature information as well as spatial information.

The U-net network 210 generates a global feature vector from the contracting stage and a heatmap from the expanding stage. A heatmap may be thought of as a representation of correlation between two sets of data. In this particular implementation, the heatmap is a 21-dimensional heatmap, where each dimension is a representation of the correlation (or probability) between one of the 21 keypoints and all possible 2D locations in the 2D RGB image. The heatmap is processed by a spatial softmax layer 214, which converts each dimension of the 21-dimensional heatmap to a single 2D location that has the highest probability for each of the 21 keypoints. The global feature vector is processed by a post-U-net feedforward network (FFN) 212 (a FFN may also be referred to as a perceptron) to output a regressor that estimates the 2D location for each of the 21 keypoints. The outputs of the post-U-net FFN 212 and spatial softmax layer 214 are concatenated together with the global feature vector by a concatenation function 216. Thus, the output from the concatenation function 216 are 21 vectors that represent the estimated 2D location for the 21 keypoints, where each vector includes the global feature vector (which is the same for all keypoints) concatenated with the (x,y) location estimated by the regressor and the (x,y) location estimated by the heatmap. For example, the global feature vector may have a length of 2048, the regressor estimate may have a length of 2 and the heatmap estimate may have a length of 2, such that each vector outputted by the concatenation function 216 has a total length of 2052.

An advantage of concatenating the outputs of the contracting stage and the expanding stage of the U-net network 210 is that each output provides different information about the 2D locations of the keypoints. For example, it may be easier to train the U-net network 210 to generate a heatmap with a desired level of accuracy in predicting the 2D locations of the keypoints, however the heatmap typically has lower resolution than the 2D RGB image input (e.g., a 56×56 pixel heatmap may be generated for a 224×224 pixel 2D image input) and there may be quantization error when processed by the spatial softmax layer 214. On the other hand, the global feature vector may have higher resolution and may not suffer from quantization error, however it may be more difficult to train the U-net network 210 to generate a global feature vector with a desired level of accuracy in predicting the 2D locations of the keypoints. By concatenating information from the global feature vector with information from the heatmap, the disclosed 3D hand pose estimation network 200 may be able to benefit from the global feature vector and the heatmap, while mitigating the disadvantages of each individual type of information.

The each of the 21 vectors outputted by the concatenation function 216 is provided to a transformer encoder 220 as a token (i.e., a total of 21 tokens). These 21 tokens are processed by the transformer encoder 220 to output 21 estimated 2D locations for the respective 21 keypoints. Each token represents a discrete element (in this case, the estimated 2D location of each keypoint) that is inputted to the transformer encoder 220, on which attention will be computed by the transformer encoder 220.

The transformer encoder 220 may include a first encoder FFN 222, followed by an encoder self-attention (SA) layer 224, and followed by a second encoder FFN 226. The transformer encoder 220 serves to refine the estimated 2D location of each of the 21 keypoints, while the encoder SA layer 224 serves to relate the estimated 2D locations of the 21 keypoints to each other global context (e.g., the estimated 2D location of one keypoint corresponding to a given joint on a finger would be expected to have some impact on the estimated 2D location of another keypoint corresponding to another joint on the same finger). The output of the transformer encoder 220 (which is the output of the second encoder FFN 226) are embeddings that are representations of the refined estimated 2D locations of the 21 keypoints. The output of the transformer encoder 220 is further processed by a post-encoder FFN 242, to obtain a first set of 2D keypoints. A 2D keypoint is a 2D location (e.g., (x,y) location) of a keypoint, such as a joint of a hand. In particular, the transformer encoder 220 outputs 21 embeddings representing estimated 2D locations (corresponding to the 21 keypoints), which are processed by respective 21 post-encoder FFNs 242 (only one is shown for simplicity), to obtain a first set of 21 2D keypoints. Each post-encoder FFN 242 serves to convert a respective embedding (which may be vector of length greater than 2, for example a vector having length 512) outputted from the second encoder FFN 226 to a vector of length 2 representing the estimated 2D location (e.g., a vector with x and y values) of one keypoint. The first set of 2D keypoints represents the estimated location of the joints of the hand in a first view (e.g., a frontal view), corresponding to the view captured in the 2D RGB image input.

The first set of 2D keypoints is inputted to a transformer decoder 230 as a query. The transformer decoder 230 processes the first set of 21 2D keypoints to estimate (or predict) a second set of 21 2D keypoints that represents the estimated location of the joints of the hand in a different second view (e.g., a side view).

The transformer decoder 230 may include a first decoder FFN 232, followed by a decoder SA layer 234, followed by a cross-attention (CA) layer 236, and followed by a second decoder FFN 238. The transformer decoder 230 receives the first set of 2D keypoints, outputted from the post-encoder FFN 242, as query input to the first decoder FFN 232. The decoder SA layer 234 serves to encode information about global context, similar to the encoder SA layer 224. The CA layer 236 receives the output from the decoder SA layer 234 and also receives the output from the second encoder FFN 226 (which are the embeddings outputted from the transformer encoder 220). The CA layer 236 uses the information from the transformer encoder 220 to provide context for estimating the second set of 2D keypoints. Conceptually, the CA layer 236 transforms the embeddings to 2D locations. It may be noted that the CA layer 236 receives the output from the second encoder FFN 226 instead of the output from the post-encoder FFN 242 because the embeddings (outputted from the second encoder FFN 226) may provide more information than the 2D locations (outputted by the post-encoder FFNs 242). The output of the CA layer 236 is processed by the second decoder FFN 238. The output of the transformer decoder 230 (which is the output of the second decoder FFN 238) are embeddings that are representations of the estimated 2D locations of the 21 keypoints from a second view. The output of the transformer decoder 230 is further processed by a post-decoder FFN 244, to obtain a second set of 2D keypoints. In particular, the transformer encoder 230 outputs 21 embeddings representing estimated 2D locations (corresponding to the 21 keypoints), which are processed by respective 21 post-decoder FFNs 244 (only one is shown for simplicity), to obtain the second set of 21 2D keypoints. Each post-decoder FFN 244 serves to convert a respective embedding (which may be vector of length greater than 2, for example having length 512) outputted from the second decoder FFN 238 to a vector of length 2 representing the estimated 2D location (e.g., a vector with x and y values) of one keypoint. The second set of 2D keypoints represents the estimated location of the joints of the hand in a second view (e.g., a side view) that is different from the first view represented in the first set of 2D keypoints. In particular, the second set of 2D keypoints may represent the estimated location of the joints of the hand when viewed from a second view that is not captured in the 2D RGB image input.

The different views represented by the first and second sets of 2D keypoints are illustrated in FIG. 2 as corresponding to two different Cartesian planes. For example, the first set of 2D keypoints may be an estimate of the 2D location of the joints corresponding to a frontal view of the hand that matches the view captured in the 2D RGB image input (e.g., along the x-y plane), and the second set of 2D keypoints may be an estimate of the 2D location of the joints corresponding to a right side view of the hand (e.g., along the z-y plane). However, it should be understood that the first and second sets of 2D keypoints need not correspond to views from two orthogonal planes, and it may not be necessary for either of the views to match the view captured in the 2D RGB image input. Any two 2D views that together can provide 3D information about the estimated location of the joints may be possible.

The first and second sets of 2D keypoints are aggregated together by an aggregator function 246. For example, a weighted averaging function may be used, in which the weights applied to the first and second sets of 2D keypoints are learned through training of the 3D hand pose estimation network 200. The output of the aggregator function 246 is a set of estimated 3D keypoints for the hand captured in the 2D RGB image input. A 3D keypoint is a 3D location (e.g., (x,y,z) location) of a keypoint, such as a joint of a hand, in 3D space.

The set of estimated 3D keypoints may be outputted to be further processed by other software modules, such as a gesture recognition software module or a 3D rendering software module. For example, a gesture recognition software module may process the estimated 3D keypoints using a classifier network to predict the class of the hand gesture, in order to recognize a gesture-based input command. In another example, a 3D rendering software module may use the HALO model (e.g., as described by Karunratanakul et al., "A Skeleton-Driven Neural Occupancy Representation for Articulated Hands", arXiv: 2106.11399, 2021) to render a 3D image of the hand from the estimated 3D keypoints.

To train the 3D hand pose estimation network 200, end-to-end training may be used. The training dataset may contain 2D RGB images of hands (with or without cropping) that have been annotated with the 3D locations of the 21 keypoints of each hand. The losses that may be computed and used to train the weights of the 3D hand pose estimation network 200 may include a 2D keypoint location L1 loss (applied to the output of FFN 242 and FFN 244), a 3D keypoint location L1 loss (applied to the output of the aggregator 246), and a binary cross-entropy (BCE) loss computed on the heatmap output.

The 3D hand pose estimation network 200, as disclosed herein, enables estimation of the 3D locations of keypoints corresponding to the joints of a hand, using a 2D RGB image as input. Notably, the 3D hand pose estimation network 200 has been found to provide quality estimation of the 3D hand pose, based on only estimation of the locations of the joints of the hand, without requiring estimation of the overall hand shape (i.e., without having to estimate the location of the vertices of a 3D mesh of the hand).

The 3D hand pose estimation network 200 may be trained using images annotated with the 21 keypoints of the hand, without requiring annotation of the hundreds of vertices of a 3D mesh. An advantage of the disclosed 3D hand pose estimation network 200 is that collection of training data may be less costly and quicker, compared to other existing approaches for 3D hand pose estimation. Because the training data required to train the 3D hand pose estimation network 200 may be more easily collected, the 3D hand pose estimation network 200 may benefit from having a richer and more expansive training dataset compared to the training dataset required to train other existing approaches.

Simulations have found that the 3D hand pose estimation network 200 as disclosed herein exhibits similar or better performance compared to existing state of the art approaches, while requiring comparatively sparsely annotated training data. The 3D hand pose estimation network 200 may be trained using real-life annotated training data and/or synthetic annotated training data, which may further simplify the task of collecting training data.

Figure 3:
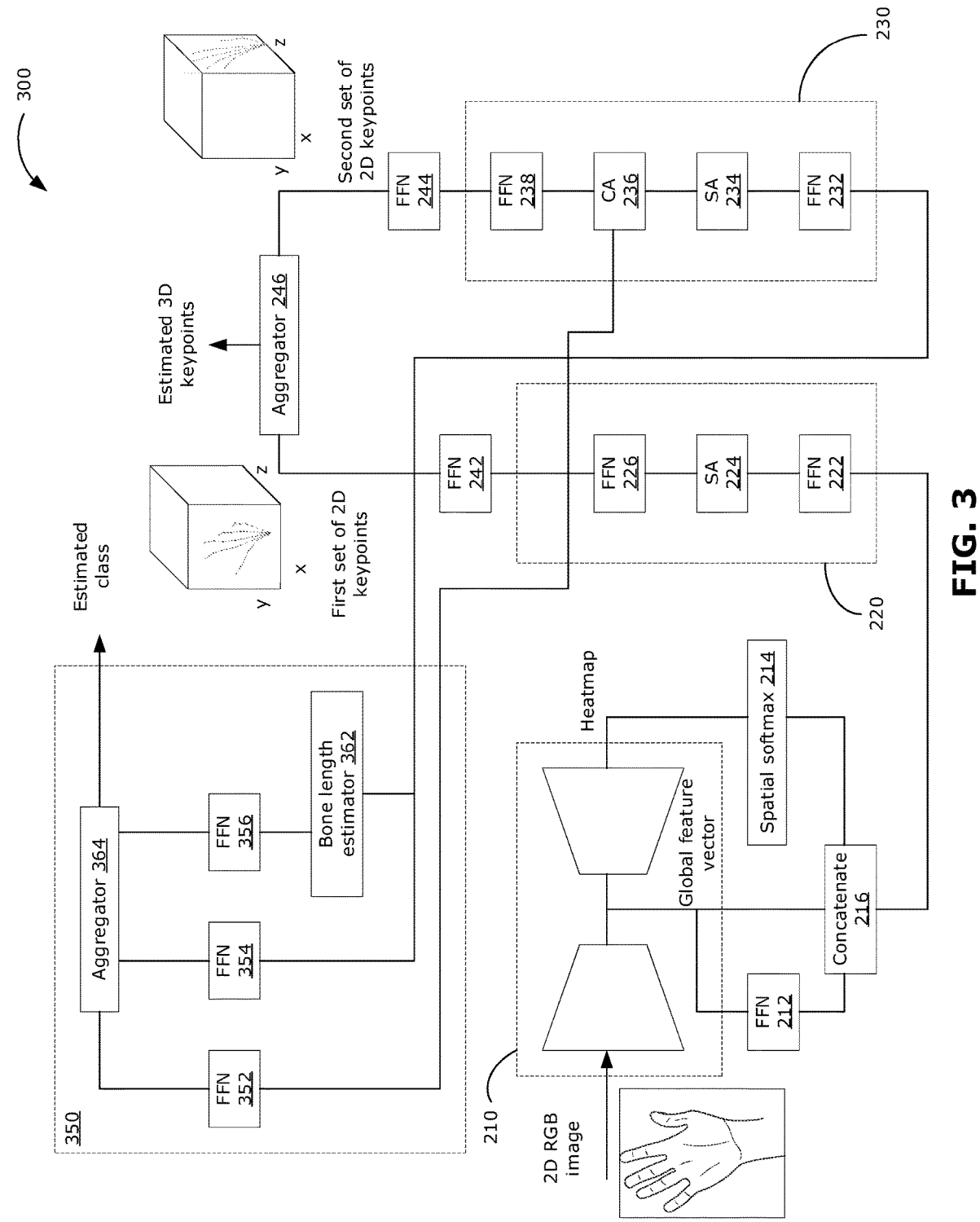
FIG. 3 is a block diagram of another example 3D hand pose estimation network, in accordance with examples of the present disclosure.

FIG. 3 is a block diagram of another example 3D hand pose estimation network 300, in accordance with examples of the present disclosure.

The 3D hand pose estimation network 300 is similar to the 3D hand pose estimation network 200 of FIG. 2, with an additional branch 350 for estimating a hand class. In particular, the branch 350 may be trained (as part of the end-to-end training of the 3D hand pose estimation network 300) to classify the 2D RGB image as a left hand, a right hand or optionally not a hand (e.g., background). It should be noted that although the branch 350 estimates a hand class, the branch 350 is not a conventional classifier neural network. For example, the branch 350 uses relatively simple one-layer FFNs rather than a multi-layered neural network as in conventional classifiers.

As shown in FIG. 3, many components of the 3D hand pose estimation network 300 are similar to those of the 3D hand pose estimation network 200 of FIG. 2, and are denoted with the same reference characters. These similar components need not be discussed again in detail.

The branch 350 outputs an estimated hand class, where the hand class may be a class from the set {left hand, right hand} (which may be numerically represented as {0, 1}) or a class from the set {not hand, left hand, right hand} (which may be numerically represented as {0, 1, 2}).

In the 3D hand pose estimation network 300 of FIG. 3, an additional class token is provided as input to the transformer encoder 220, in addition to the 21 tokens previously described (for a total of 21+1 input tokens). The additional class token is a machine-learnable token (i.e., a token with a value that is learned in the training phase). The output from the transformer encoder 220 are 21 outputs corresponding to the estimated 2D locations of the 21 keypoints (e.g., embeddings representing the estimated 2D locations of the keypoints, as previously described with respect to FIG. 2), and an additional class output (for a total of 21+1 outputs). The embeddings are provided to the post-encoder FFNs 242, similar to that described with respect to FIG. 2, and the output from the post-encoder FFNs 242 form the first set of 2D keypoints. The class output is processed by a first classification FFN 352 to output a class estimation. The first set of 21 2D keypoints (outputted by the post-encoder FFNs 242) are also processed by respective 21 classification FFNs 354 (only one is shown for simplicity) to output respective 21 class estimations. A bone length estimator 362 computes an estimated bone length, by computing a distance between two selected 2D keypoints, as a reference bone length. The estimated bone length may be a scalar value that is computed for each bone in the hand (with each bone corresponding to a particular pair of 2D keypoints). The reference bone length is also processed by a third classification FFN 356 to output another class estimation. Thus, the outputs from the FFNs 352, 354, 356 are 23 class estimations.

The 23 class estimations are aggregated together by an aggregator function 364. For example, a weighted averaging function may be used, in which the weights applied to the 23 class estimations are learned through training of the 3D hand pose estimation network 300. The output of the aggregator function 364 is a single value representing an estimated class for the hand.

In the 3D hand pose estimation network 300, the transformer decoder 230 may perform the functions as previously described with respect to FIG. 2, to generate the second set of 2D keypoints. Similarly to the 3D hand pose estimation network 200 of FIG. 2, the input to the first decoder FFN 232 is the first set of 2D keypoints outputted by the post-encoder FFNs 242. The CA layer 236 receives the 21 embeddings outputted by the second encoder FFN 226 (the class output may not be provided to the CA layer 236). The transformer decoder 230 generates embeddings representing the estimated 2D locations of the 21 keypoints from a second view, and the embeddings are processed by the post-decoder FFNs 244 to generate the second set of 2D keypoints, similar to the process previously described with respect to FIG. 2. In some examples, the outputs of the post-decoder FFNs 244 may be provided to the branch 350 instead of the outputs from the post-encoder FFNs 242.

The first and second sets of 2D keypoints may be combined by the aggregator 246 (e.g., using a weighted average with learned weights), as previously described.

The 3D hand pose estimation network 300 may be trained end-to-end, using a training dataset that contains 2D RGB images of hands (with or without cropping) that have been annotated with the 3D locations of the 21 keypoints of each hand, using losses as described above with respect to FIG. 2.

The 3D hand pose estimation network 300 as disclosed herein may enable classification of a hand as a left or right hand, without requiring an additional multi-layered classifier neural network. Because the branch 350 is relatively simple (e.g., requiring only one-layered FFNs and relatively simple computations in the bone length estimator 362 and aggregator 364), the estimation of the hand class may not add significant processing requirements to the 3D hand pose estimation network 300. This may enable the disclosed 3D hand pose estimation network 300 to be more easily implemented in computing devices having limited processing power (e.g., mobile devices) and/or may enable the disclosed 3D hand pose estimation network 300 to be of practical use for real-time (or near real-time) processing of a detected hand, such as for processing gesture inputs in real-time (or near real-time).

It may be noted that the 3D hand pose estimation network 200 may accurately perform pose estimation (e.g., accurately estimate 21 3D keypoints) without requiring classification of the hand as left hand or right hand. In this way, the 3D hand pose estimation network 200, 300 (with or without hand classification) may be considered ambilevous or "handedness" (i.e., left hand or right hand) agnostic, meaning the handedness of the hand captured in the input 2D RGB image is not expected to affect performance of the 3D hand pose estimation network 200, 300. This may help to improve the efficiency of the disclosed 3D hand pose estimation network 200, 300 because the training dataset need not be limited to only left hands or only right hands and/or because there is no need for an additional hand classifier neural network (which would otherwise introduce additional processing and increase the difficulty of training the overall network).

In some examples, the 3D hand pose estimation network 200, 300 (with or without left/right hand classification) has been found to be capable of processing a 1080p video (that includes one or two hands in the video frames) within 50 ms for each video frame, which may be suitable for real-time applications.

Figure 4:
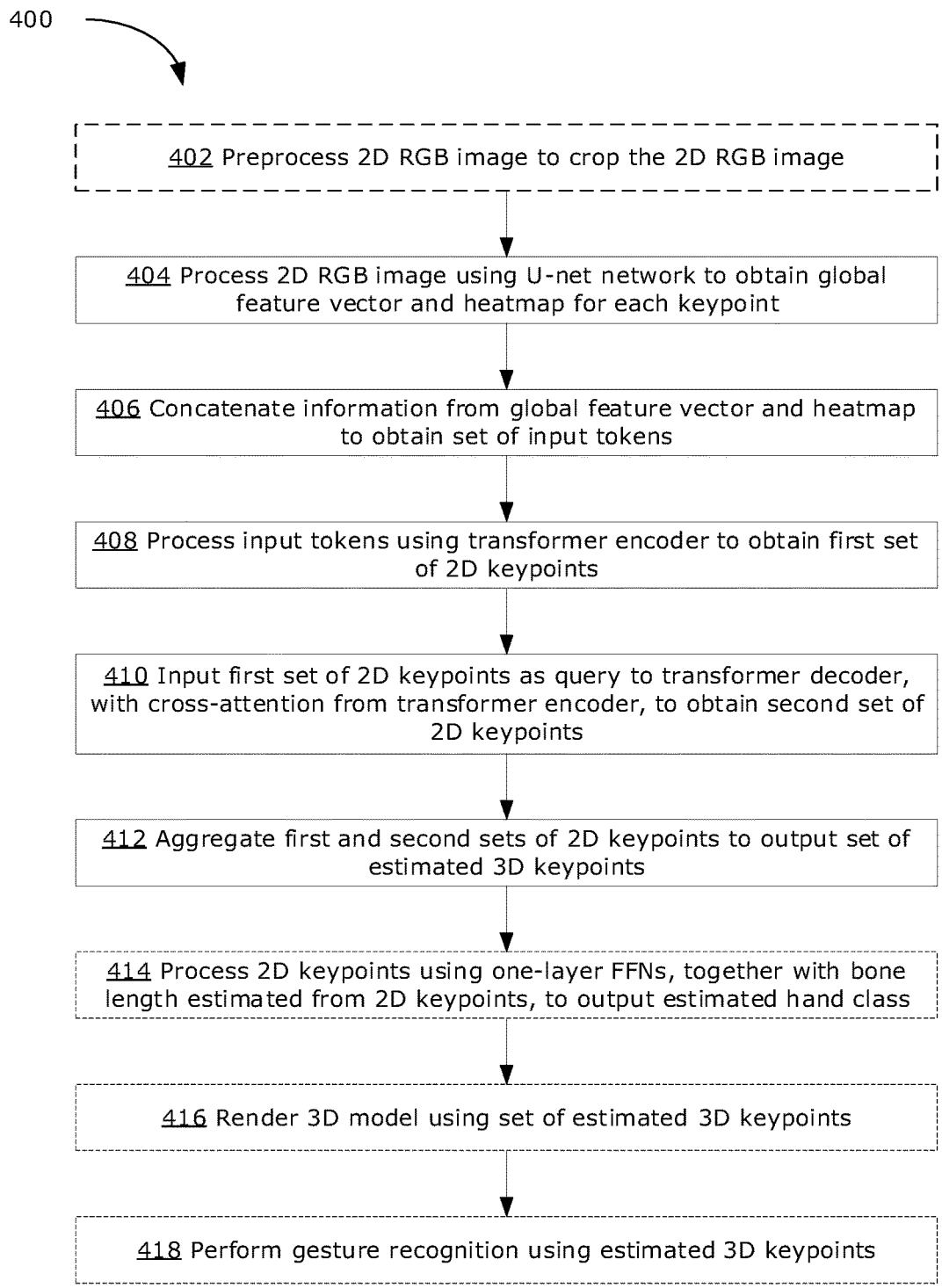
FIG. 4 is a flowchart of an example method for 3D hand pose estimation, in accordance with examples of the present disclosure.

FIG. 4 is a flowchart illustrating an example method 400 which may be used to estimate the 3D keypoints of a hand from a 2D RGB image input. The method 400 may be performed by the computing system 100, for example using the 3D hand pose estimation network 200 or the 3D hand pose estimation network 300 as described above. The processing unit 102 of the computing system 100 may execute computer readable instructions (which may be stored in the memory 112) to cause the computing system 100 to perform the method 400. The method 400 may be performed using a single physical machine (e.g., a workstation or server), a plurality of physical machines working together (e.g., a server cluster), or cloud-based resources (e.g., using virtual resources on a cloud computing platform).

Optionally, at 402, a 2D RGB image may be preprocessed by a hand detector (which may be a trained hand detection neural network) to crop the 2D RGB image. For example, the hand detector may detect a hand in a larger image and estimate the bounding box for the detected hand. Then, the larger image may be cropped to an image patch corresponding to the estimated bounding box. The resulting image patch may be the 2D RGB image that is further processed by the 3D hand pose estimation network 200, 300.

In some examples, step 402 may be omitted. For example, preprocessing of the 2D RGB image may be performed by a different computing system, or may be performed at some time prior to the method 400.

At 404, the 2D RGB image containing a detected hand is processed by a U-net network to obtain a global feature vector and a heatmap for each keypoint. As described above, the global feature vector may be obtained from the contracting stage of the U-net network 200 and a 21-dimensional heatmap (corresponding to 21 keypoints) may be obtained from the expanding stage of the U-net network 200.

At 406, information from the global feature vector and the heatmap are concatenated to obtain a set of input tokens. In some examples, the global feature vector may be processed by a FFN to obtain a regressor to obtain a 2D global estimate of each keypoint, and the heatmap may be processed by a spatial softmax layer to obtain a 2D heatmap estimate of each keypoint. Then, an input token representing a given keypoint may be obtained by concatenating the global feature vector with the 2D global estimate and the 2D heatmap estimate of that given keypoint. In this way, an input token may be obtained for each keypoint that is to be estimated. For example, if there are 21 keypoints to be estimated (e.g., corresponding to the joints of the hand), a set of 21 input tokens may be obtained by this concatenation.

At 408, the set of input tokens is processed using a transformer encoder to obtain a first set of 2D keypoints, which represents estimated 2D locations of keypoints (e.g., 21 keypoints corresponding to the joints of the hand) from a first view (e.g., a view that is captured in the 2D RGB image, such as a frontal view of the hand). In some examples, the output from the transformer encoder may be processed by a set of post-encoder FFNs in order to obtain the first set of 2D keypoints.

At 410, the first set of 2D keypoints is inputted as a query to a transformer decoder, with cross-attention from the transformer encoder, to obtain a second set of 2D keypoints. The second set of 2D keypoints represents estimated 2D locations of keypoints (e.g., 21 keypoints corresponding to the joints of the hand) from a different second view (e.g., a view that is not captured in the 2D RGB image, such as a side view of the hand). In some examples, the output from the transformer decoder may be processed by a set of post-decoder FFNs in order to obtain the second set of 2D keypoints.

At 412, the first and second sets of 2D keypoints are aggregated to output a set of estimated 3D keypoints, which represents estimated 3D locations of keypoints (e.g., 21 keypoints corresponding to the joints of the hand) in 3D space. The first and second sets of 2D keypoints may be aggregated using a weighted average (where the weights are learned weights), to obtain a single set of estimated 3D keypoints.

Optionally, at 414, a set of 2D keypoints (e.g., the first set of 2D keypoints) are processed using respective one-layer FFNs. For example, a first set of 21 2D keypoints may be processed using respective 21 one-layer FFNs. As well, a set of bone lengths is estimated from the 2D keypoints (e.g., by computing a distance between two keypoints representing two joints connected by a single length of bone), and the set of bone lengths is also processed by a FFN. In some examples, a learned class token may also be processed by a FFN. The outputs from the FFNs may form a set of estimated classes, which may be aggregated together (e.g., using a weighted average, where the weights are learned weights) to output an estimated hand class. The estimated hand class may be an estimation of the handedness of the hand in the 2D RGB image (e.g., left hand or right hand), for example.

Optionally, at 416, a 3D model may be rendered using the set of estimated 3D keypoints. For example, a 3D model of a hand may be rendered by mapping the estimated 3D keypoints, corresponding to the 21 joints of a hand, to a 3D mesh that models a 3D hand. Then 3D mesh may then be rendered. The rendered 3D model may be outputted to be displayed, for example on a display of the computing system 100. In some examples, the estimated hand class indicating the handedness of the hand may be used to render the 3D model. In some examples, the step 416 may be omitted. For example, the set of estimated 3D keypoints may be outputted to another system for rendering, or it may not be necessary to render a 3D model for display.

Optionally, at 418, gesture recognition may be performed using the set of estimated 3D keypoints. For example, the estimated 3D keypoints may be inputted to a gesture recognition modules (which may be another trained neural network) to classify the hand as one of several possible recognized hand gestures. This may enable a hand gesture to be recognized as an input command to the computing system 100, for example. In some examples, the step 418 may be omitted. For example, the set of estimated 3D keypoints may be outputted to another system for gesture recognition, or it may not be necessary to perform gesture recognition.

In various examples, the present disclosure describes methods and systems for estimating 3D hand pose from a single 2D RGB image. The disclosed 3D hand pose estimation network may be conceptually thought of as approaching the 3D hand pose estimation problem as two sub-problems of performing 2D pose estimation (solved using 2D transformer networks), then performing a view synthesis task to obtain the 3D pose estimation.

Examples of the present disclosure may be useful for practical implementations where processing power is limited (e.g., on mobile devices) and/or where real-time 3D pose estimation is desired (e.g., for real-time hand modeling and/or real-time gesture recognition). Examples of the present disclosure may be applicable to AR or VR applications, in which hand gestures need to be processed in real-time to enable a user to interact with virtual objects in an intuitive manner. In another example, smart devices such as smart TVs, IoT devices, smart appliances, etc. may use examples of the present disclosure for gesture recognition, to enable a user to provide gesture input.

Although the present disclosure describes methods and processes with steps in a certain order, one or more steps of the methods and processes may be omitted or altered as appropriate. One or more steps may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a computing system to execute examples of the methods disclosed herein. The machine-executable instructions may be in the form of code sequences, configuration information, or other data, which, when executed, cause a machine (e.g., a processor or other processing unit) to perform steps in a method according to examples of the present disclosure.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The invention claimed is:

1. A computing system comprising:
a processing unit configured to execute instructions to cause the computing system to estimate a set of 3D keypoints representing a 3D hand pose by:
processing a 2D image containing a detected hand using a U-net network to obtain a global feature vector and a heatmap for each of the keypoints;
concatenating information from the global feature vector and the heatmap to obtain a set of input tokens;
processing the input tokens using a transformer encoder to obtain a first set of 2D keypoints representing estimated 2D locations of the keypoints in a first 2D view;
inputting the first set of 2D keypoints as a query to a transformer decoder, with cross-attention from the transformer encoder, to obtain a second set of 2D keypoints representing estimated 2D locations of the keypoints in a second 2D view; and
aggregating the first and second sets of 2D keypoints to output the set of estimated 3D keypoints.

2. The computing system of claim 1, wherein the processing unit is further configured to execute instructions to cause the computing system to perform operations of:
estimating a set of one or more bone lengths from the first set of 2D keypoints;
processing the first set of 2D keypoints and the estimated set of one or more bone lengths using respective one-layer feedforward networks, to obtain a plurality of hand class estimations representing a handedness of the detected hand; and
aggregating the plurality of hand class estimations to obtain an estimated hand class representing an estimated handedness of the detected hand.

3. The computing system of claim 1, wherein the processing unit is further configured to execute instructions to cause the computing system to perform operations of:
rendering a 3D model representation of the detected hand by mapping the set of estimated 3D keypoints to a 3D mesh.

4. The computing system of claim 1, wherein the processing unit is further configured to execute instructions to cause the computing system to perform operations of:
performing gesture recognition by processing the set of estimated 3D keypoints using a gesture recognition software module.

5. The computing system of claim 1, wherein the first set of 2D keypoints represent estimated 2D locations of the keypoints in the first 2D view corresponding to a view of the detected hand captured in the 2D image, and wherein the second set of 2D keypoints represent estimated 2D locations of the keypoints in the second 2D view corresponding to a different view of the detected hand not captured in the 2D image.

6. The computing system of claim 1, wherein concatenating information from the global feature vector and the heatmap to obtain a set of input tokens comprises:
processing the global feature vector using a feedforward network to obtain a regressor representing a 2D global estimation of each respective keypoint;
processing the heatmap using a spatial softmax layer to obtain a 2D heatmap estimation of each respective keypoint; and
concatenating the global feature vector with the 2D global estimation and the 2D heatmap estimation to obtain the input token for each respective keypoint.

7. The computing system of claim 1, wherein the U-net network, the transformer encoder and the transformer decoder are trained together end-to-end, using a training dataset comprising 2D images annotated with keypoints corresponding to joints of a hand and without annotation of vertices corresponding to a 3D mesh of the hand.

8. The computing system of claim 1, wherein the computing system is one of:
a mobile device;
a smart appliance;
an Internet of Things (IOT) device;
an augmented reality (AR) device; or
a virtual reality (VR) device.

9. A computer-implemented method for estimating a set of 3D keypoints representing a 3D hand pose comprising:
processing a 2D image containing a detected hand using a U-net network to obtain a global feature vector and a heatmap for each of the keypoints;
concatenating information from the global feature vector and the heatmap to obtain a set of input tokens;
processing the input tokens using a transformer encoder to obtain a first set of 2D keypoints representing estimated 2D locations of the keypoints in a first 2D view;
inputting the first set of 2D keypoints as a query to a transformer decoder, with cross-attention from the transformer encoder, to obtain a second set of 2D keypoints representing estimated 2D locations of the keypoints in a second 2D view; and
aggregating the first and second sets of 2D keypoints to output the set of estimated 3D keypoints.

10. The method of claim 9, further comprising:
estimating a set of one or more bone lengths from the first set of 2D keypoints;
processing the first set of 2D keypoints and the estimated set of one or more bone lengths using respective one-layer feedforward networks, to obtain a plurality of hand class estimations representing a handedness of the detected hand; and
aggregating the plurality of hand class estimations to obtain an estimated hand class representing an estimated handedness of the detected hand.

11. The method of claim 9, further comprising:
rendering a 3D model representation of the detected hand by mapping the set of estimated 3D keypoints to a 3D mesh.

12. The method of claim 9, further comprising:
performing gesture recognition by processing the set of estimated 3D keypoints using a gesture recognition software module.

13. The method of claim 9, wherein the first set of 2D keypoints represent estimated 2D locations of the keypoints in the first 2D view corresponding to a view of the detected hand captured in the 2D image, and wherein the second set of 2D keypoints represent estimated 2D locations of the keypoints in the second 2D view corresponding to a different view of the detected hand not captured in the 2D image.

14. The method of claim 9, wherein concatenating information from the global feature vector and the heatmap to obtain a set of input tokens comprises:
processing the global feature vector using a feedforward network to obtain a regressor representing a 2D global estimation of each respective keypoint;
processing the heatmap using a spatial softmax layer to obtain a 2D heatmap estimation of each respective keypoint; and
concatenating the global feature vector with the 2D global estimation and the 2D heatmap estimation to obtain the input token for each respective keypoint.

15. The method of claim 9, wherein the U-net network, the transformer encoder and the transformer decoder are trained together end-to-end, using a training dataset comprising 2D images annotated with keypoints corresponding to joints of a hand and without annotation of vertices corresponding to a 3D mesh of the hand.

16. A non-transitory computer-readable medium having instructions encoded thereon, wherein the instructions are executable by a processing unit of a computing system to cause the computing system to perform operations of:
processing a 2D image containing a detected hand using a U-net network to obtain a global feature vector and a heatmap for each of the keypoints;
concatenating information from the global feature vector and the heatmap to obtain a set of input tokens;
processing the input tokens using a transformer encoder to obtain a first set of 2D keypoints representing estimated 2D locations of the keypoints in a first 2D view;
inputting the first set of 2D keypoints as a query to a transformer decoder, with cross-attention from the transformer encoder, to obtain a second set of 2D keypoints representing estimated 2D locations of the keypoints in a second 2D view; and
aggregating the first and second sets of 2D keypoints to output the set of estimated 3D keypoints.

17. The non-transitory computer-readable medium of claim 16, wherein the instructions are executable to further cause the computing system to perform operations of:
estimating a set of one or more bone lengths from the first set of 2D keypoints;
processing the first set of 2D keypoints and the estimated set of one or more bone lengths using respective one-layer feedforward networks, to obtain a plurality of hand class estimations representing a handedness of the detected hand; and
aggregating the plurality of hand class estimations to obtain an estimated hand class representing an estimated handedness of the detected hand.

18. The non-transitory computer-readable medium of claim 16, wherein the first set of 2D keypoints represent estimated 2D locations of the keypoints in the first 2D view corresponding to a view of the detected hand captured in the 2D image, and wherein the second set of 2D keypoints represent estimated 2D locations of the keypoints in the second 2D view corresponding to a different view of the detected hand not captured in the 2D image.

19. The non-transitory computer-readable medium of claim 16, wherein concatenating information from the global feature vector and the heatmap to obtain a set of input tokens comprises:

processing the global feature vector using a feedforward network to obtain a regressor representing a 2D global estimation of each respective keypoint;

processing the heatmap using a spatial softmax layer to obtain a 2D heatmap estimation of each respective keypoint; and concatenating the global feature vector with the 2D global estimation and the 2D heatmap estimation to obtain the input token for each respective keypoint.

20. The non-transitory computer-readable medium of claim 16, wherein the U-net network, the transformer encoder and the transformer decoder are trained together end-to-end, using a training dataset comprising 2D images annotated with keypoints corresponding to joints of a hand and without annotation of vertices corresponding to a 3D mesh of the hand.

* * * * *